June 16, 1953  C. R. TIGERT ET AL  2,642,076
METERING AND TIMING CONTROLLER FOR SPRINKLING SYSTEMS
Filed Nov. 21, 1950  2 Sheets-Sheet 2
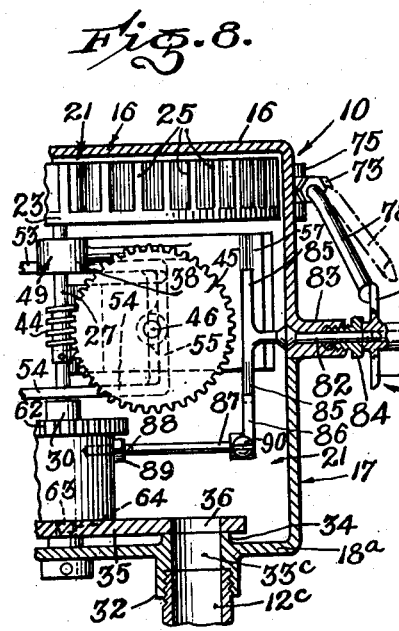
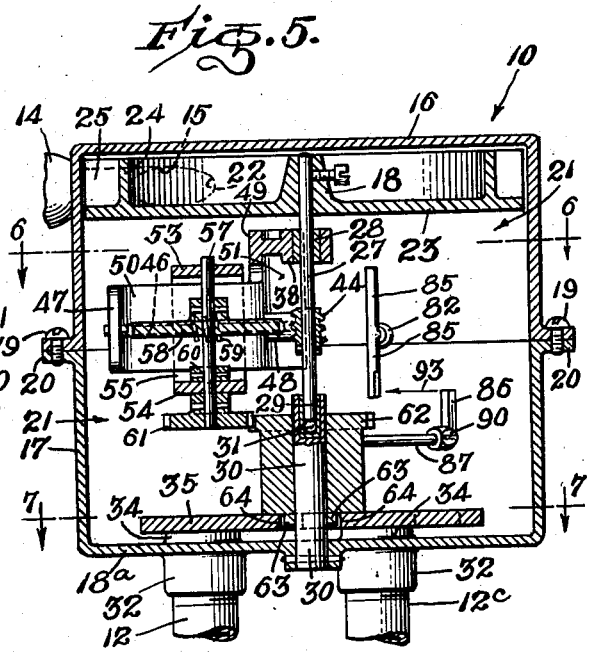
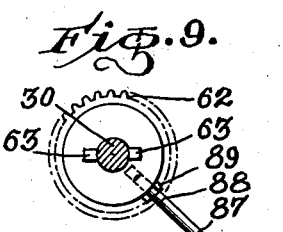
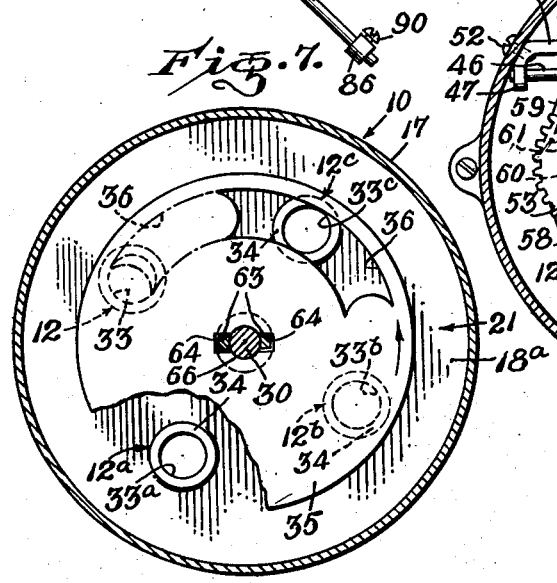
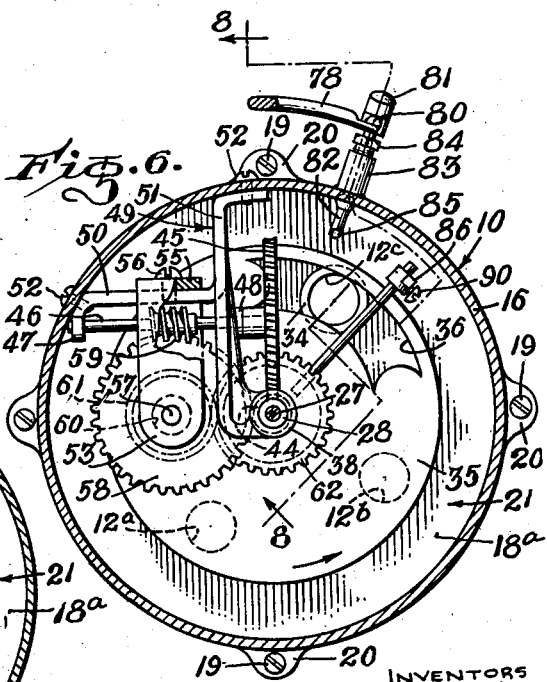
INVENTORS
CLYDE R. TIGERT &
DONALD E. FINNICUM
BY Lynn Latta
ATTORNEY.

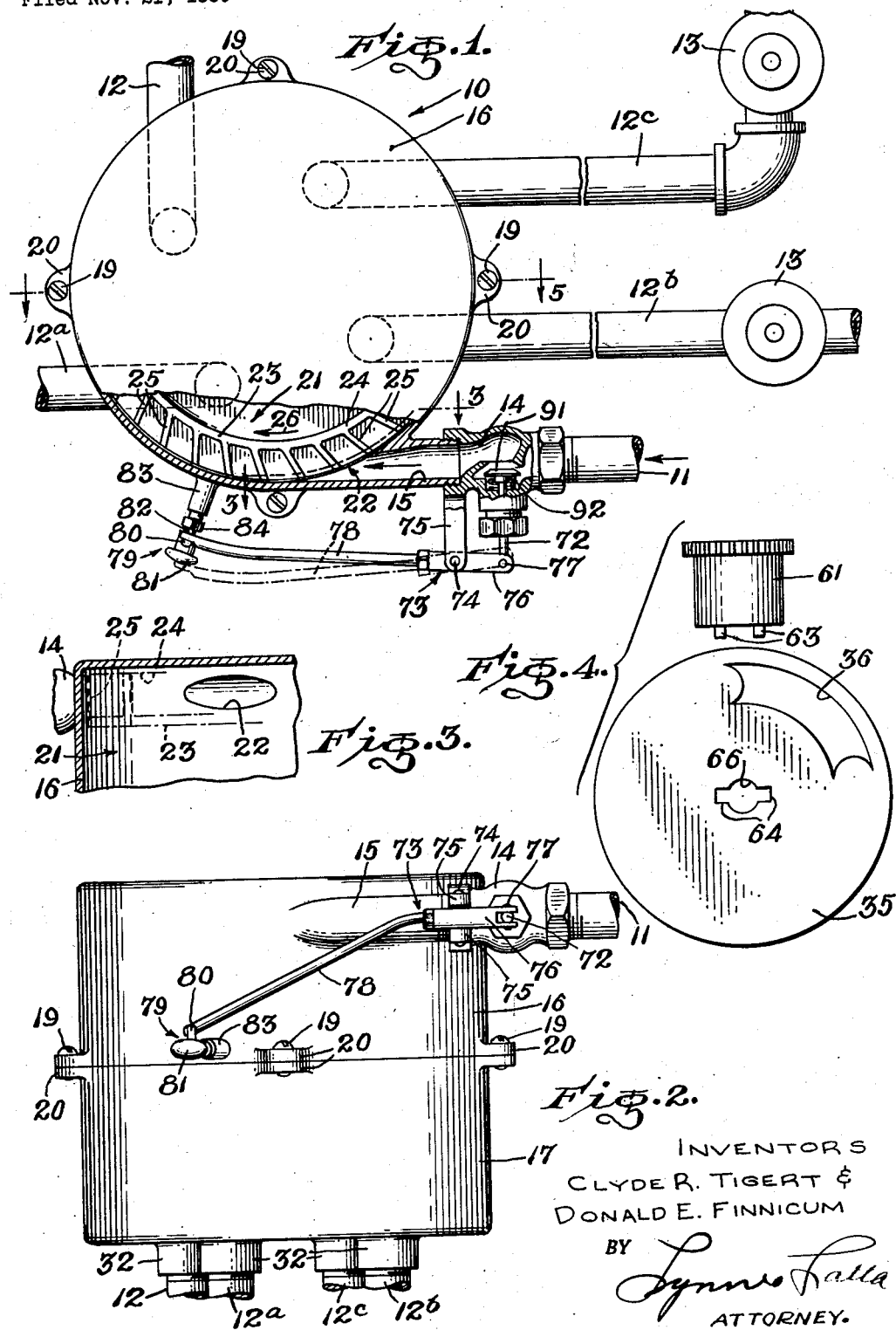

Patented June 16, 1953

2,642,076

UNITED STATES PATENT OFFICE 2,642,076

METERING AND TIMING CONTROLLER FOR SPRINKLING SYSTEMS

Clyde R. Tigert and Donald E. Finnicum, Upland, Calif.

Application November 21, 1950, Serial No. 196,801

11 Claims. (Cl. 137—119)

This invention relates to apparatus for the automatic control of sprinkling systems and has as its general object to provide a control which will successively turn on and then turn off each of a series of branch lines of a sprinkling system for lawns, flower beds, parks, golf courses or the like.

One of the specific objects of the invention is to provide a controller which is adapted to be started manually, which will complete a full cycle of actuation of the several sprinkler lines controlled by it, and which will then automatically shut off the water supply to the sprinkling system.

Another object is to provide such a controller which is arranged to be actuated by the water that is being delivered to the sprinkling system, in such a manner as to have both a timing and a metering function, delivering to each branch line of the system a predetermined quantity of water within a predetermined period of time.

A further object is to provide a controller as outlined above, which is adapted to function as a substitute for the several valves conventionally employed in the manual control of the various branch lines of a sprinkling system, thereby eliminating the necessity for such valves.

A further object of the invention is to provide a controller as above outlined, embodying mechanism for successively establishing a connection between a water supply line and each of a plurality of branch lines of a sprinkling system, together with valve means, adapted to be manually opened and automatically closed at the end of a full cycle of operation, for controlling the flow from said supply line, and further embodying a common drive from a turbine actuated by the flow of water from said supply line, for actuating both said valve means and said means for successively establishing communication with the branch sprinkler line.

A further object is to provide a controller such as that outlined above, which is of relatively simple and inexpensive construction yet thoroughly durable and dependable in operation.

Other objects will become apparent in the ensuing specification and appended drawings in which:

Fig. 1 is a plan view of a controller embodying my invention, with portions thereof broken away and shown in section to better illustrate the internal construction, and with portions of a sprinkling system illustrated in connection therewith;

Fig. 2 is a side view of the same;

Fig. 3 is a detail sectional view illustrating the turbine nozzle, taken on the line 3—3 of Fig. 1;

Fig. 4 is an exploded view of the clutch assembly;

Fig. 5 is a vertical sectional view of the controller taken on the line 5—5 of Fig. 1;

Fig. 6 is a horizontal sectional view thereof, taken on the line 6—6 of Fig. 5;

Fig. 7 is a horizontal sectional view thereof, taken on the line 7—7 of Fig. 5, with the metering valve disc cover removed;

Fig. 8 is a detail vertical sectional view of one side of the timer, taken on the line 8—8 of Fig. 6; and Fig. 9 is a detail, inverted plan view of a portion of the clutch assembly which establishes drive from the gear train to the metering valve disc, taken as indicated by line 7—7 of Fig. 5.

As an example of one form in which the invention may be embodied, I have shown in the drawings a controller, indicated generally at 10, interposed between a water supply line 11 and a plurality of branch lines 12, 12a, 12b and 12c of a lawn sprinkling system having a series of sprinkler heads 13 connected to the respective lines 12, 12a, etc. The controller 10 takes the place of the several manually operable valves conventionally interposed between water supply line 11 and branch lines 12, 12a, etc. For controlling the flow of water from supply line 11 to the branch sprinkler lines, unit 10 incorporates a single valve 14 having a conventional threaded connection at one end with supply line 11 and a similar connection at its other end with a nozzle 15 which is arranged to deliver a stream of water tangentially into a cylindrical housing of controller 10, said housing embodying upper and lower cylindrical housing sections 16 and 17. Housing sections 16 and 17 may be secured together in any suitable manner, as, for example, by means of bolts 19 extended through openings in ears 20 on the respective housing sections 16, 17.

Nozzle 15 communicates with the upper region of a chamber 21 (defined within housing 16, 17) through a port 22 in lateral wall section 16 (Fig. 1). Disposed within this upper region of chamber 21 is a turbine wheel 23 in the form of a flat disc having an annular cylindrical flange 24 extending upwardly therefrom and spaced inwardly from the periphery thereof. Turbine wheel 23 has a series of blades 25 extending from flange 24 to its periphery. Each blade is inclined rearwardly and outwardly with reference to the direction of rotation of turbine wheel 23. Blades 25 cooperate with flange 24 to define pockets into which the stream of water issuing from port 22 will be injected, resulting in the rotation of turbine wheel 23 in the direction indicated by arrow 26 in Fig. 1.

Turbine wheel 23 has a hub 18 secured upon the upper portion of a shaft 27, the upper end of shaft 27 being journalled within a bushing 28 in a bracket 49, and the lower end of shaft 27 being journalled within a bushing 29 in the upper end of a post 30 which is mounted centrally in bottom plate 18a. A suitable thrust bearing, such as the ball 31 may be interposed between the lower end of shaft 27 and the bottom of bushing 29.

Branch lines 12, 12a, etc. (Fig. 3) are connected to chamber 21 through bottom plate 18a, being threaded into bossses 32 formed integrally with bottom plate 18a. Bosses 32 are hollow to define ports 33, 33a, 33b, 33c (Fig. 7) the upper extremities of which are defined by valve seats 34 projecting upwardly from bottom plate 18. The upper faces of valve seats 34 are disposed in a common plane and are smoothly finished for sealing engagement with the flat lower face of a distributor valve 35 of disc form. Valve 35 has therein an arcuate port 36 extending, concentrically therein, through somewhat less than 90 degrees. Valve seats 34 are disposed 90 degrees apart, at the same radius as port 36, whereby port 36 may successively register with ports 33, 33a, etc. The circumferential extent of port 36 is such that, as valve 35 rotates, it will commence to open one of the ports 33, 33a, etc., immediately after having closed a preceding port 33, 33a, etc.

As valve 35 rotates, water from chamber 21 of the controller housing may flow successively through each of the succeeding ports 33, 33a, etc., and into the respective sprinkler lines 12, 12a, etc. At this point it may be noted that the stream of water entering chamber 21, after it loses its force against turbine wheel 23, flows downwardly between the periphery of turbine wheel 23 and the inner wall of housing member 16, filling chamber 21 below turbine wheel 23, under a pressure head sufficient to operate sprinklers 13.

Drive is transmitted to rotatable distributor valve 35 from shaft 27, through reduction gearing which provides a reduction of high ratio. This ratio, in the apparatus shown is in the neighborhood of 1 to 1600. The drive is transmitted from shaft 27 through a worm 44 mounted thereon, worm 44 meshing with a worm gear 45. Gear 45 is mounted upon a horizontal shaft 46 which is journalled in bearing parts 47 and 48 on the bracket 49. Bracket 49 has arms 50 and 51 secured to lateral housing wall member 16 in any suitable manner as by means of screws 52, and an arm 38 in the end of which is mounted bushing 28. Bracket 49 has a pair of vertically spaced, horizontally extending arms 53 and 54 which obviously may be formed integrally with bracket 49, as by die-casting, or may, as shown, be integral parts of a separate U-shaped yoke 55 embracing arm 50 and secured thereto in any suitable manner, as by means of screw 56. Mounted in arms 53, 54, is a vertical shaft 57 upon which is secured a worm gear 58. A worm 59, mounted on horizontal shaft 46, meshes with worm gear 58.

Shaft 57 may be supported by means of a thrust bearing collar 60, secured thereto and having bearing contact with the upper face of arm 54. Shaft 57 has a portion thereof projecting below arm 54 and carrying a spur pinion 61 which is secured thereto. Pinion 61 meshes with a spur gear 62 which is journalled upon vertical post 30.

Gear 62 has mounted in the under side of its hub a pair of diametrically opposed clutch jaws 63 which extend downwardly and are received in notches 64 (Fig. 7) in valve disc 35. Valve disc 35 has a central bore 66 which is journalled upon post 30. Drive is transmitted from gear 62 to valve disc 35 through the jaws 63.

Valve 14 is of a conventional self-closing poppet valve type. For example, it may embody a valve element 91, biased toward closed position by a spring 92, and having an operating stem 72 for transmitting opening movement thereto. Operating stem 72 is actuated by a lever 73 pivoted at 74 in a yoke 75 formed integrally with the casing of valve 14, for swinging movement in a generally horizontal plane. Short arm 76 of lever 73 is pivoted at 77 to stem 72. Long arm 78 of lever 73 extends to a point adjacent the side of housing wall 16, where it is engaged by a latch device 79. Latch device 79 includes a finger 80 for engaging the end of lever arm 78, a knob 81 to which finger 80 is secured (knob 81 functioning for manual setting of latch finger 80 in a latching position), and a shaft 82 on which knob 81 is secured. Shaft 82 extends through and is rotatably mounted in a boss 83 in the side of housing member 16 and through a packing gland 84 which seals the shaft therein to prevent leakage of water from housing 16—18. Shaft 82 is provided at its inner end with a downwardly extending trigger arm 85 which is arranged to be tripped by a finger 86 which rotates with gear 62. Finger 86 is mounted on the outer end of an arm 87 the inner end of which is mounted in the hub of gear 62. This mounting may, as shown, be effected by providing the inner end of arm 87 with a threaded portion 88, threaded into the hub of gear 62 and locked by a lock nut 89. Finger 86 may be mounted on arm 87 by having a hub portion receiving the end of arm 87 and secured thereto by a set screw 90. Either set screw or threaded connection 88, 89, may be utilized for adjusting the position of finger 86 for correct engagement with trigger 85.

*Operation*

Normally, lever 73 is in the position indicated in dotted lines in Fig. 1. In this position, valve 14, under its spring bias, will be closed. When it is desired to start the operation of the sprinkling system, lever 73 is moved to its full line position shown in Fig. 1 and knob 81 is rotated to place finger 80 of latch device 79 against the end of lever arm 78, latching it in the position in which valve 14 is held open.

A stream of water will now be injected from nozzle 15 through port 22 against turbine wheel 23, rotating the latter and driving reduction gearing 44—62 so as to slowly rotate distributor valve 35 and shut off actuator arm 87 in unison in the direction indicated by arrow 93 in Figs. 3, 4 and 5. At the beginning of this cycle of operation, finger 86 will be positioned immediately forwardly of trigger 85, and valve port 36 will be in the position indicated in dotted lines in Fig. 7. In this starting position, port 33 of branch line 12 is partially open. As valve disc 35 rotates counterclockwise, this port will gradually be fully opened and water will be delivered to sprinkler line 12 for a predetermined period of time (e. g. 15 minutes) until branch line 12 is cut off. At this stage, port 33a of branch line 12a will be opening, and the flow will be gradually diverted to branch line 12a. There will be a short period of over-lap, during which both branch lines will operate simultaneously, such overlap being necessary in order to avoid shutting off the flow through the controller 10. When branch line 12a is completely open, this line will operate for a period of time the same as the period of operation of line 12, and, in succession, branch lines 12b and 12c will be similarly operated each for the same period of time. In Figs. 5–8, the parts are shown in the position in which branch line 12c has been operating for approximately half its period. In this position, finger 86 is approaching trigger 85, and as valve disc 35 cuts off the port 33c of branch line 12c, finger 86 will swing trigger 85 clockwise, as viewed in Fig. 5, to rotate finger 80 of latching element 79 to a position clearing the end of lever arm 78. Lever 73 will then move, under the spring bias of valve 14, to its dotted line position of Fig. 1, in which position valve 14 will be closed, thus shutting off the flow of water through the controller 10 and thereby shutting off the flow to branch sprinkler line 12c.

We claim:

1. A controller for a sprinkling system having a plurality of branch sprinkler lines and a common source of water supply therefor, comprising a housing defining a flow chamber, said housing having an inlet and a plurality of outlet ports communicating with the respective branch lines, a shutoff valve for establishing communication between said supply line and said inlet, means biasing said valve toward closed position and normally closing the same, an operating member for said valve, holding means extending through the wall of said housing, having an external part for coaction with said operating member for normally holding said shutoff valve releasably open, said holding means including a trigger extending into said flow chamber, a distributor valve adapted to successively establish communication between said flow chamber and each of said outlet ports in rotation, while cutting off the remaining outlet ports, means rotatable within said housing for engaging said trigger to actuate said holding means to release said operating member for effecting closing of said shutoff valve, and means actuated by a stream of water entering said flow chamber through said inlet and having a common drive connection to said trigger actuating means and said distributor valve for rotating the same through one complete revolution in which water from said flow chamber is delivered successively to each of said branch lines and in which said trigger is actuated to effect the closing of said shutoff valve upon completion of delivery of water to the last of said branch lines.

2. A controller as defined in claim 1, wherein said distributor valve comprises a rotatable disc and wherein said housing has a bottom in which said outlet ports are arranged in concentric array about the axis of rotation of said distributor valve.

3. A controller as defined in claim 1, wherein said operating member comprises a lever connected to said shutoff valve, said holding means including a latching device adapted to engage said operating lever to hold it in a position opening said valve, and a connection between said trigger and said latching device, whereby said latching device is actuated to release said operating lever when said trigger is actuated, said connection comprising a part extended through the lateral wall of said housing and attached to said trigger and latching device respectively at its inner and outer ends.

4. A controller for automatically controlling the operation of a sprinkling system embodying a plurality of branch sprinkler lines and a common source of water supply therefor, comprising a housing defining a flow chamber, said housing including a bottom defining a plurality of outlet ports arranged in annular concentric array about the vertical axis of said housing and communicating respectively with said branch lines, said bottom having means to which said branch lines are respectively connected, said housing having a lateral wall section provided in its upper region with a tangential inlet for the injection of a stream of water tangentially into said housing, a cover closing the top of said housing, a shaft disposed centrally and vertically in said housing for rotation therein, a turbine wheel mounted on said shaft adjacent said cover and having a series of pockets communicating with said inlet for receiving rotation from the stream of water injected therethrough, a distributor valve rotatably mounted in said housing adjacent said bottom and adapted to close said outlet ports, said distributor valve being in the form of a disc having therein a port for successively registering with said outlet ports, a normally closed shut-off valve for establishing communication between said water supply line and said inlet port, holding means including a part extending through the lateral wall of said housing, including means engaged by said part outside the housing for holding said shutoff valve, in open position, and including, within said flow chamber, a trigger element, an actuator for said trigger element, rotatably mounted within said housing, and reduction gearing including a drive element on said shaft and a driven element providing a common drive connection to said distributor valve disc and to said trigger actuator.

5. A controller as defined in claim 4, including a post mounted in said bottom, coaxial with said shaft and projecting upwardly within said flow chamber, the lower end of said shaft being journalled in said post, and said driven element comprising an annular hub-like member receiving and rotatably mounted upon said post, with a gear member at the upper end thereof and said distributor valve disc at the lower end thereof, said trigger actuator being carried by said driven element.

6. A controller as defined in claim 4, wherein said trigger actuator comprises an arm secured to said driven element and projecting radially therefrom and a trigger actuating finger projecting upwardly from the outer end of said arm.

7. In a controller for a sprinkling system including a plurality of branch sprinkler lines and a common supply line therefor, a housing defining a flow chamber, said housing having a bottom to which said branch lines are connected in annular concentric array about the central vertical axis of said housing, said bottom having means defining a plurality of outlet ports communicating respectively with said branch lines, a distributor valve rotatably mounted within said housing adjacent said bottom in a position to close said outlet ports, said distributor valve being in the form of a disc having a port for successively establishing communication with said outlet ports so as to direct flow from said chamber successively to the respective branch lines in rotation, said housing having a lateral wall section and a cover closing the top thereof, a self-closing shutoff valve for establishing communication between said supply line and said flow chamber, an injection nozzle extending from said shutoff valve to said lateral housing wall and terminating in a tangential inlet to said flow chamber in the upper region thereof, a turbine wheel rotatably mounted within said upper region of the flow chamber in a position to be rotated by a stream of water injected through said inlet, reduction gearing including a drive element connected to said turbine wheel and a driven element centered on said vertical axis of rotation of said distributor valve disc and connected to said distributor valve disc to rotate the same, said reduction gearing being disposed within said flow chamber intermediate said valve disc and said turbine wheel, a lever for actuating said shutoff valve to the open position, a latch finger to engage the end of said lever to hold it in the valve opening position, said lateral wall section having a radially disposed boss, a shaft rotatably mounted within said boss, on the outer end of which shaft said finger is mounted for swinging movement from said lever retaining position to a lever releasing position, a trigger extending radially from the inner end of said shaft, within said flow chamber, and a trigger actuator carried by said driven element and extending radially therefrom to a position to engage said trigger to move said latch finger to the lever releasing position at the end of one revolution of the driven element.

8. In a controller for a sprinkling system embodying a plurality of branch sprinkler lines, and a common water supply line therefor, a housing defining a flow chamber, including a bottom member to which said branch lines are connected in annular, uniformly circumferentially spaced relation about the central vertical axis of said housing, said bottom including a plurality of upwardly projecting annular valve seats respectively defining a plurality of outlet ports with which the respective branch lines communicate, a circular valve of disc form mounted in said housing for rotation about said central vertical axis, said valve having a flat under face seating against said annular valve seats and having a port adapted to successively register with said outlet ports for directing the flow from said flow chamber in rotation to the respective branch lines, a normally closed shutoff valve and a nozzle extending from said shutoff valve to said housing and terminating in an inlet communicating with the upper region of said flow chamber, said shutoff valve functioning to control the flow of water from said supply line to said flow chamber, manually settable means to hold said shutoff valve in open position a turbine wheel disposed in said upper region of the flow chamber and positioned to be rotated by a jet of water injected through said inlet, reduction gearing including a drive element connected to said turbine wheel and a driven element centered on said central vertical axis, and a drive connection extending downwardly from said driven element and connected to said distributor valve disc, for rotating the same, and means rotating with said driven element for actuating said holding means at the end of one revolution of the driven element, to release said shutoff valve for closing movement.

9. A controller as defined in claim 8 including a post fixed in said bottom, at said central vertical axis and projecting upwardly, said driven element comprising an annular member rotatably surrounding said post, said driven element having at its lower end, clutch dogs interengageable with said valve disc for transmitting drive thereto.

10. A controller as defined in claim 8, said holding means comprising a shaft extending radially through the lateral wall of said housing and rotatable therein, and a trigger on the inner end of said shaft, a trigger actuator mounted in said driven element and extending radially for engagement with said trigger for rotating said shaft at the end of a full cycle of operation of said controller, and means connected to the outer end of said shaft for releasing said shutoff valve for closing movement when said trigger crank is thus rotated.

11. A controller as defined in claim 8, wherein said driving element comprises a worm disposed at said central vertical axis, a worm wheel disposed in a vertical, radial plane and meshing with said worm, a horizontal shaft upon which said worm wheel is mounted, a second worm on said horizontal shaft, a second worm gear meshing with said second worm and disposed in a horizontal plane, a vertical shaft on which said second worm gear is mounted, a spur pinion on said vertical shaft, and spur teeth on said driven element, meshing with said spur pinion.

CLYDE R. TIGERT.
DONALD E. FINNICUM.

References Cited in the file of this patent

UNITED STATES PATENTS

| Number | Name | Date |
|---|---|---|
| 1,753,240 | Howell | Apr. 8, 1930 |
| 1,992,877 | Monthan | Feb. 26, 1935 |
| 2,081,510 | Smart | May 25, 1937 |